(12) United States Patent
Park et al.

(10) Patent No.: US 11,961,223 B2
(45) Date of Patent: Apr. 16, 2024

(54) APPARATUS FOR PREDICTING WHEEL PERFORMANCE IN VEHICLE AND METHOD THEREFOR

(71) Applicants: HYUNDAI MOTOR COMPANY, Seoul (KR); KIA CORPORATION, Seoul (KR); Sookmyung Women's university industry-academic cooperation foundation, Seoul (KR)

(72) Inventors: Jong Ho Park, Incheon (KR); Chang Gon Kim, Seoul (KR); Chul Woo Jung, Yongin-si (KR); Sang Min Lee, Seoul (KR); Min Kyoo Kang, Seongnam-si (KR); Ji Un Lee, Seoul (KR); Kwang Hyeon Hwang, Seoul (KR); Nam Woo Kang, Yongin-si (KR); So Young Yoo, Seoul (KR); Seong Sin Kim, Seoul (KR); Sung Hee Lee, Seoul (KR)

(73) Assignees: HYUNDAI MOTOR COMPANY, Seoul (KR); KIA CORPORATION, Seoul (KR); SOOKMYUNG WOMEN'S UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 437 days.

(21) Appl. No.: 17/235,362

(22) Filed: Apr. 20, 2021

(65) Prior Publication Data

US 2022/0044378 A1 Feb. 10, 2022

(30) Foreign Application Priority Data

Aug. 4, 2020 (KR) .................. 10-2020-0097470

(51) Int. Cl.
*G06T 7/00* (2017.01)
*G06F 18/214* (2023.01)
(Continued)

(52) U.S. Cl.
CPC ............ *G06T 7/001* (2013.01); *G06F 18/214* (2023.01); *G06T 3/60* (2013.01); *G06T 15/00* (2013.01);
(Continued)

(58) Field of Classification Search
CPC .......... G06T 7/001; G06T 3/60; G06T 15/00; G06T 2207/20076; G06T 2207/20081;
(Continued)

(56) References Cited

U.S. PATENT DOCUMENTS

2014/0270466 A1* 9/2014 Dam .................. G01M 17/027
382/141

FOREIGN PATENT DOCUMENTS

JP 2021195038 A * 12/2021

OTHER PUBLICATIONS

English Translation of JP 2021195038 A (Year: 2021).*
(Continued)

*Primary Examiner* — Ayodeji O Ayotunde
(74) *Attorney, Agent, or Firm* — MORGAN, LEWIS & BOCKIUS LLP (57) ABSTRACT

An apparatus for predicting performance of a wheel in a vehicle: includes a learning device that generates a latent space for a plurality of two-dimensional (2D) wheel images based on a convolutional autoencoder (CAE), extracts a predetermined number of the plurality of 2D wheel images from the latent space, and learns a dataset having the plurality of 2D wheel images and performance values corresponding to the plurality of 2D wheel images; and a controller that predicts performance for the plurality of 2D
(Continued)

wheel images based on a performance prediction model obtained by the learning device.

16 Claims, 11 Drawing Sheets
(1 of 11 Drawing Sheet(s) Filed in Color)

(51) Int. Cl.
   *G06T 3/60* (2006.01)
   *G06T 15/00* (2011.01)
(52) U.S. Cl.
   CPC ............... *G06T 2200/08* (2013.01); *G06T 2207/20076* (2013.01); *G06T 2207/20081* (2013.01); *G06T 2207/30164* (2013.01)
(58) Field of Classification Search
   CPC ......... G06T 2207/30164; G06T 7/0004; G06F 18/214

USPC ........................................................ 382/152
See application file for complete search history.

(56) References Cited

OTHER PUBLICATIONS

Yoo, Soyoung et al., "Integrating Deep Learning into CAD/CAE System: Case Study on Road Wheel Design Automation", arXiv. 2006.02138v1[cs.GR], Cornell University, Submitted May 25, 2020.

Yoo, Soyoung et al., "Deep Learning based CAD/CAE Framework", 2020 The Korean Society of Mechanical Engineers Collection of Papers of Spring Conference on CAE and Applied Mechanics KSME 20CA-Th02A01.

Kang, Namwoo, "Deep Learning-based CAD/CAE Framework", Asian Congress of Structural and Multidisciplinary Optimization 2020 (ACSM02020), Seoul, KR, May 24-28, 2020.

* cited by examiner

APPARATUS FOR PREDICTING WHEEL PERFORMANCE IN VEHICLE AND METHOD THEREFOR

CROSS-REFERENCE TO RELATED APPLICATION

This application claims the benefit of priority to Korean Patent Application No. 10-2020-0097470, filed in the Korean Intellectual Property Office on Aug. 4, 2020, the entire contents of which are incorporated herein by reference.

TECHNICAL FIELD

The present disclosure relates to predicting wheel performance in a vehicle based on deep learning or deep neural network.

BACKGROUND

In general, deep learning or deep neural network may be a type of machine learning, which may be an artificial neural network (ANN) with multiple layers between the input and the output. Such an ANN may include a convolution neural network (CNN), a recurrent neural network (RNN), or the like depending on the structure, the problem to be addressed, the purpose, and the like thereof.

Particularly, other than the CNN mainly used in the vision field or the RNN mainly handling sequence data such as natural languages or voices, the ANN may include a convolutional autoencoder (CAE) and generative adversarial networks (GAN).

The CAE is a cutting-edge tool for learning of a convolution filter and is an unsupervised learning algorithm of learning only a function of extracting a feature used to reconstruct the input, whereas the CNN is a supervised learning algorithm. In other words, the CAE is a network for extracting a feature (a latent code z) from a 2D image and reconstructing the 2D image based on the extracted feature.

An existing technology of predicting wheel performance in the vehicle may convert a 2D image of a wheel designed by a designer into a 3D image and inputting the converted 3D image to an analysis program, which is generally and widely known, to predict performance of the wheel.

As such an existing technology should involve the process of converting the 2D wheel image into the 3D wheel image to predict the performance of the wheel, the usefulness of the existing technology is degraded.

Details described in the background art are written to increase the understanding of the background of the present disclosure, which may include details rather than an existing technology well known to those skilled in the art.

SUMMARY

The present disclosure has been made to solve the above-mentioned problems occurring in the prior art while advantages achieved by the prior art are maintained intact.

An aspect of the present disclosure provides an apparatus for predicting performance of a wheel in a vehicle for generating a latent space for a plurality of 2D wheel images based on a convolutional autoencoder (CAE), extracting a predetermined number of 2D wheel images from the latent space, and learning a dataset having the extracted 2D wheel images and performance values corresponding to the extracted 2D wheel images, and predicting performance for a new 2D wheel image based on the learned result to predict the performance for the 2D wheel images without a process of converting the 2D wheel images into 3D wheel images and a method therefor.

The technical problems to be solved by the present inventive concept are not limited to the aforementioned problems, and any other technical problems not mentioned herein will be clearly understood from the following description by those skilled in the art to which the present disclosure pertains. Furthermore, it may be easily seen that purposes and advantages of the present disclosure may be implemented by means indicated in claims and a combination thereof.

An aspect of the present disclosure provides an apparatus for predicting performance of a wheel in a vehicle may include: a learning device that generates a latent space for a plurality of two-dimensional (2D) wheel images based on a convolutional autoencoder (CAE), extracts a predetermined number of 2D wheel images from the latent space, and learns a dataset having the extracted 2D wheel images and performance values corresponding to the extracted 2D wheel images; and a controller that predicts performance for a 2D wheel image based on a performance prediction model as a learned result obtained by the learning device.

In an embodiment of the present disclosure, the learning device may perform transfer learning based on a learning model generated from the CAE.

In an embodiment of the present disclosure, the learning device may generate the plurality of 2D wheel images different in shape from a reference 2D wheel image using generative design.

In an embodiment of the present disclosure, the learning device may sample codes in the latent space using Latin hypercube sampling from normal distribution (LHSnorm) algorithm and may extract the predetermined number of 2D wheel images based on the sampled codes.

In an embodiment of the present disclosure, the learning device may convert the extracted 2D wheel images into three-dimensional (3D) wheel images and may analyze the 3D wheel images to predict the performance values.

In an embodiment of the present disclosure, the learning device may generate dataset in which the predicted performance values and the extracted 2D wheel images are related to each other.

In an embodiment of the present disclosure, the learning device may modify the extracted 2D wheel images in the dataset to increase a number of datasets.

In an embodiment of the present disclosure, the learning device may rotate a spoke five times by 72 degrees on a source 2D wheel image to generate five 2D wheel images and may flip the five 2D wheel images to generate ten 2D wheel images.

In an embodiment of the present disclosure, the performance may include at least one of natural frequency of the wheel or a mass of the wheel according to a shape of a spoke.

Another aspect of the present disclosure provides a method for predicting wheel performance in a vehicle may include generating, by a learning device, a latent space for a plurality of 2D wheel images based on a convolutional autoencoder (CAE), extracting, by the learning device, a predetermined number of 2D wheel images from the latent space, learning, by the learning device, a dataset having the extracted 2D wheel images and performance values corresponding to the extracted 2D wheel images, and predicting, by a controller, performance for a 2D wheel image based on a performance prediction model as learned result of obtained by the learning device.

In an embodiment of the present disclosure, the learning of the dataset may include performing transfer learning based on a learning model generated from the CAE.

In an embodiment of the present disclosure, the generating of the latent space for the plurality of 2D wheel images includes generating the plurality of 2D wheel images each of which having a shape different from that of a reference 2D wheel image using generative design.

In an embodiment of the present disclosure, the extracting of the predetermined number of 2D wheel images may include sampling codes in the latent space using Latin hypercube sampling from normal distribution (LHSnorm) algorithm and extracting the predetermined number of 2D wheel images based on the sampled codes.

In an embodiment of the present disclosure, the learning of the dataset may include converting the extracted 2D wheel images into 3D wheel images and analyzing the 3D wheel images to predict the performance values.

In an embodiment of the present disclosure, the learning of the dataset may further include generating data in which the predicted performance values and the extracted 2D wheel images are related to each other.

In an embodiment of the present disclosure, the learning of the dataset may include modifying the extracted 2D wheel images in the dataset to increase a number of datasets.

In an embodiment of the present disclosure, the increasing of the number of the datasets may include rotating a spoke five times by 72 degrees on a source 2D wheel image to generate five 2D wheel images and flipping the five 2D wheel images to generate ten 2D wheel images.

BRIEF DESCRIPTION OF THE DRAWINGS

The patent or application file contains as least one drawing executed in color. Copies of this patent or patent application publication with color drawing(s) will be provided by the Office upon request and payment of the necessary fee.

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
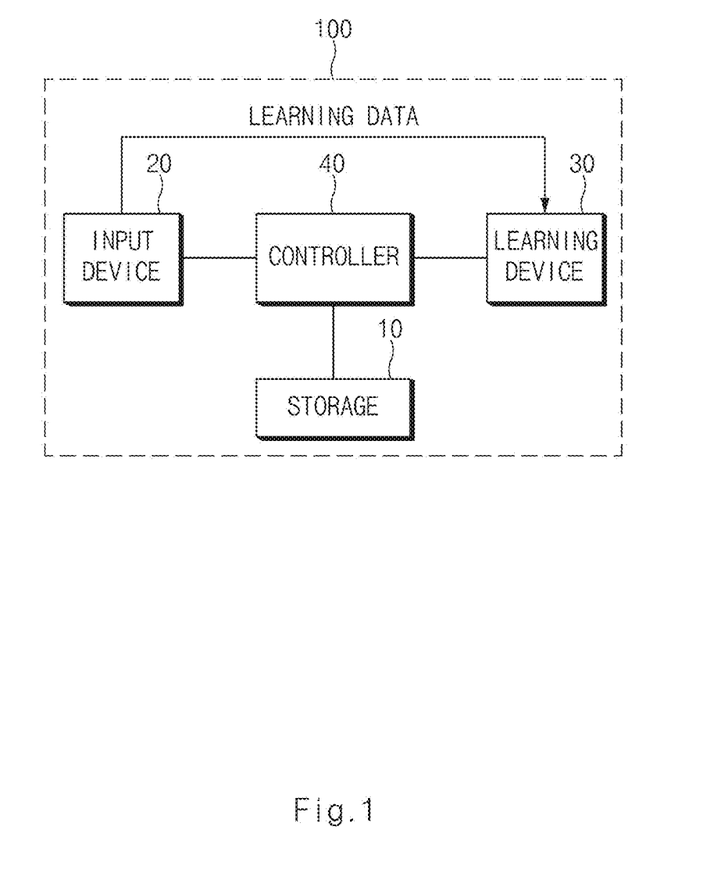
FIG. 1 is a block diagram illustrating a configuration of an apparatus for predicting wheel performance in a vehicle according to an embodiment of the present disclosure.

FIG. 1 is a block diagram illustrating a configuration of an apparatus for predicting wheel performance in a vehicle according to an embodiment of the present disclosure.

As shown in FIG. 1, an apparatus 100 for predicting wheel performance in a vehicle according to an embodiment of the present disclosure may include a storage 10, an input device 20, a learning device 30, and a controller 40. In this case, the respective components may be combined into one component and some components may be omitted, depending on a manner which executes the apparatus 100 for predicting the wheel performance in the vehicle according to an embodiment of the present disclosure. Particularly, the function of the learning device 30 may be implemented to be performed by the controller 40.

Seeing the respective components, first of all, the storage 10 may store various logics, algorithms, and programs required in a process of generating a latent space for a plurality of 2D wheel images based on a convolutional autoencoder (CAE), extracting a reference number (or a predetermined number) of 2D wheel images from the latent space, learning a dataset composed of the extracted 2D wheel images and performance values corresponding to the extracted 2D wheel images, and predicting performance for a new 2D wheel image based on the learned result.

The storage 10 may store a performance prediction model as the result of completing the learning in the learning device 30.

Such a storage 10 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

Figure 2:
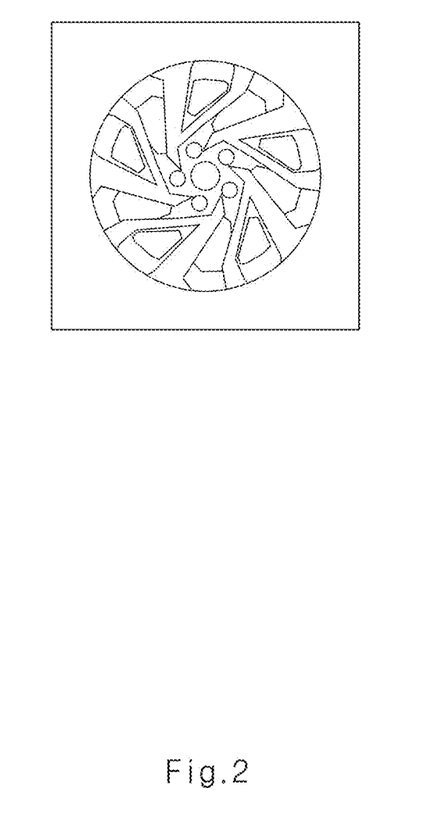
FIG. 2 is a drawing illustrating a 2D wheel image used in an apparatus for predicting wheel performance in a vehicle according to an embodiment of the present disclosure.

The input device 20 may input a 2D wheel image to the learning device 30. In this case, the 2D wheel image may be an image designed by a designer, for example, that shown in FIG. 2.

The learning device 30 may generate a latent space for a plurality of 2D wheel images based on a CAE, may extract a reference number of 2D wheel images from the latent space, and may learn a dataset composed of the extracted 2D wheel images and performance values corresponding to the extracted 2D wheel images.

Hereinafter, the learning process of the learning device 30 will be described in detail with reference to FIG. 3.

Figure 3:
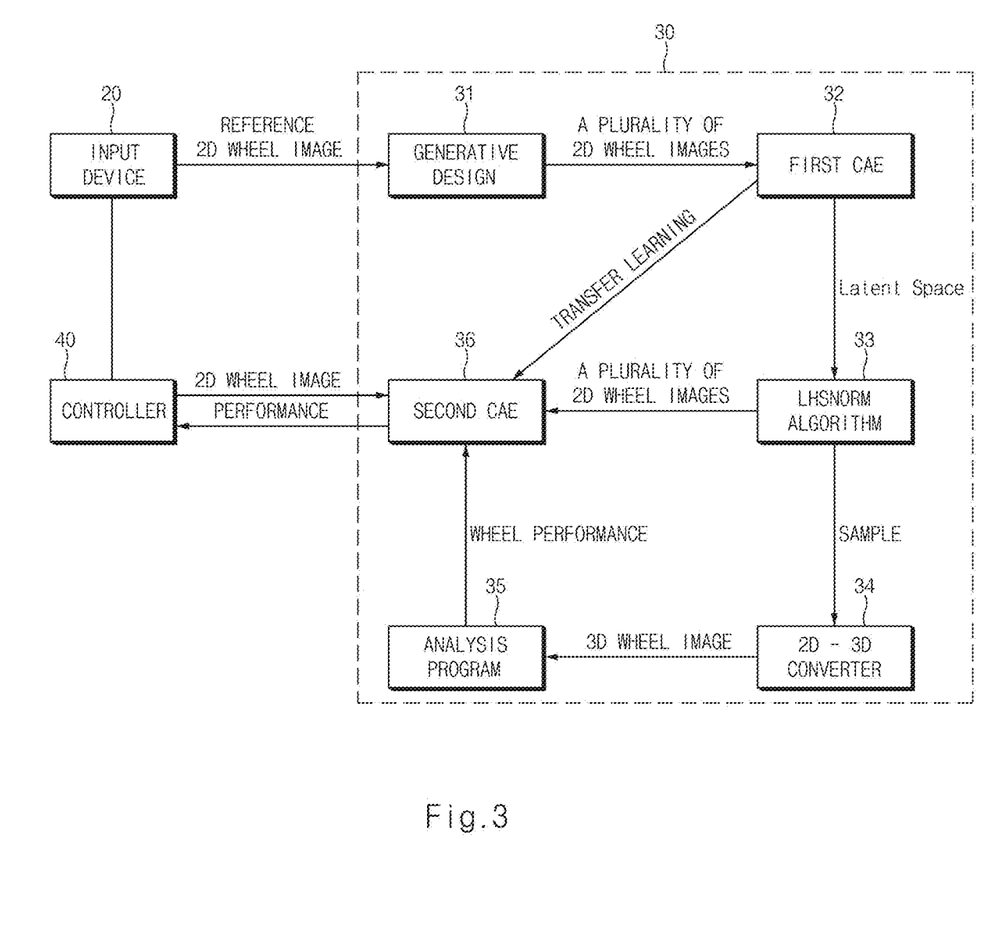
FIG. 3 is a block diagram illustrating a learning process of a learning device provided in an apparatus for predicting wheel performance in a vehicle according to an embodiment of the present disclosure.
Figure 4:
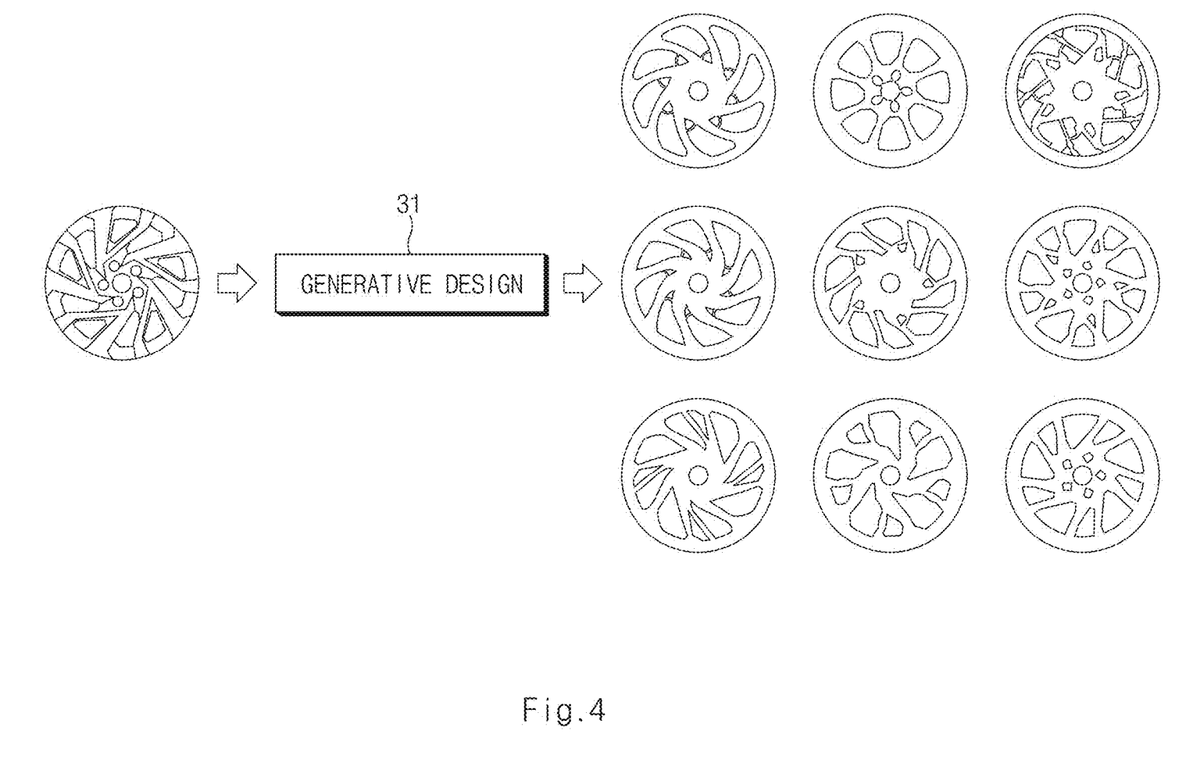
FIG. 4 is a drawing illustrating a process of generating a plurality of 2D wheel images using generative design in a learning device provided in an apparatus for predicting wheel performance in a vehicle according to an embodiment of the present disclosure.
Figure 5:
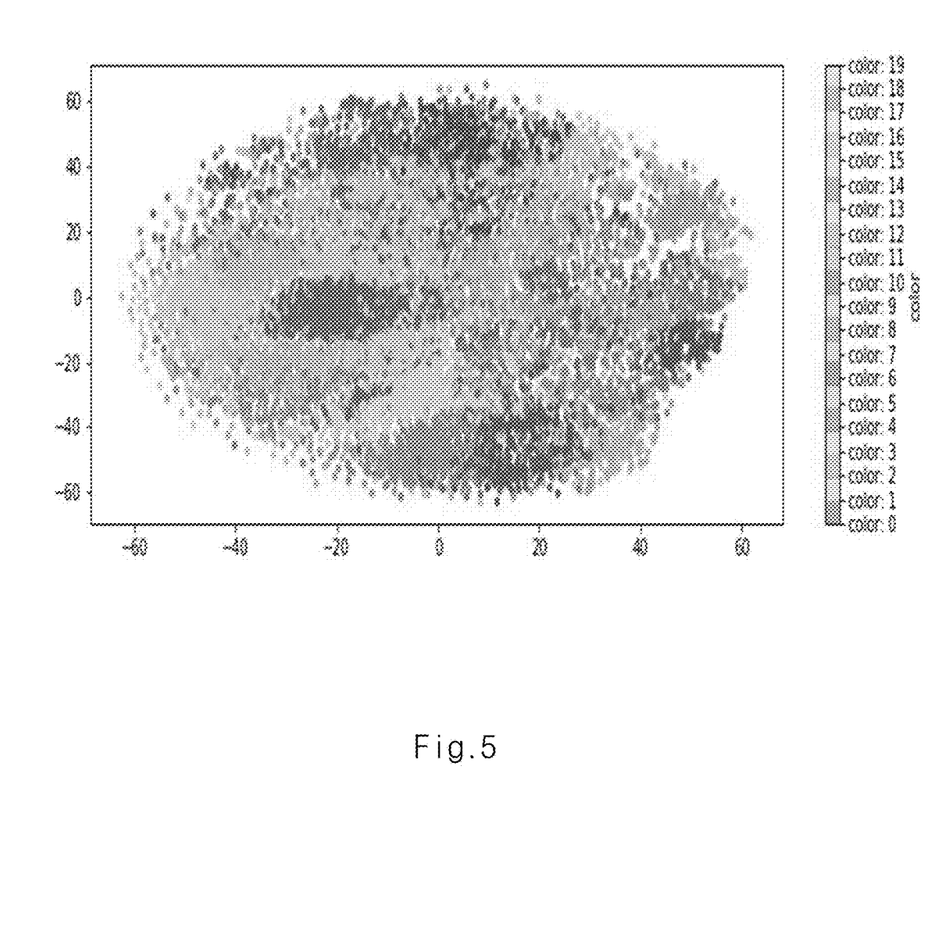
FIG. 5 is a drawing illustrating a latent space generated using a CAE by a learning device provided in an apparatus for predicting wheel performance in a vehicle according to an embodiment of the present disclosure.
Figure 6:
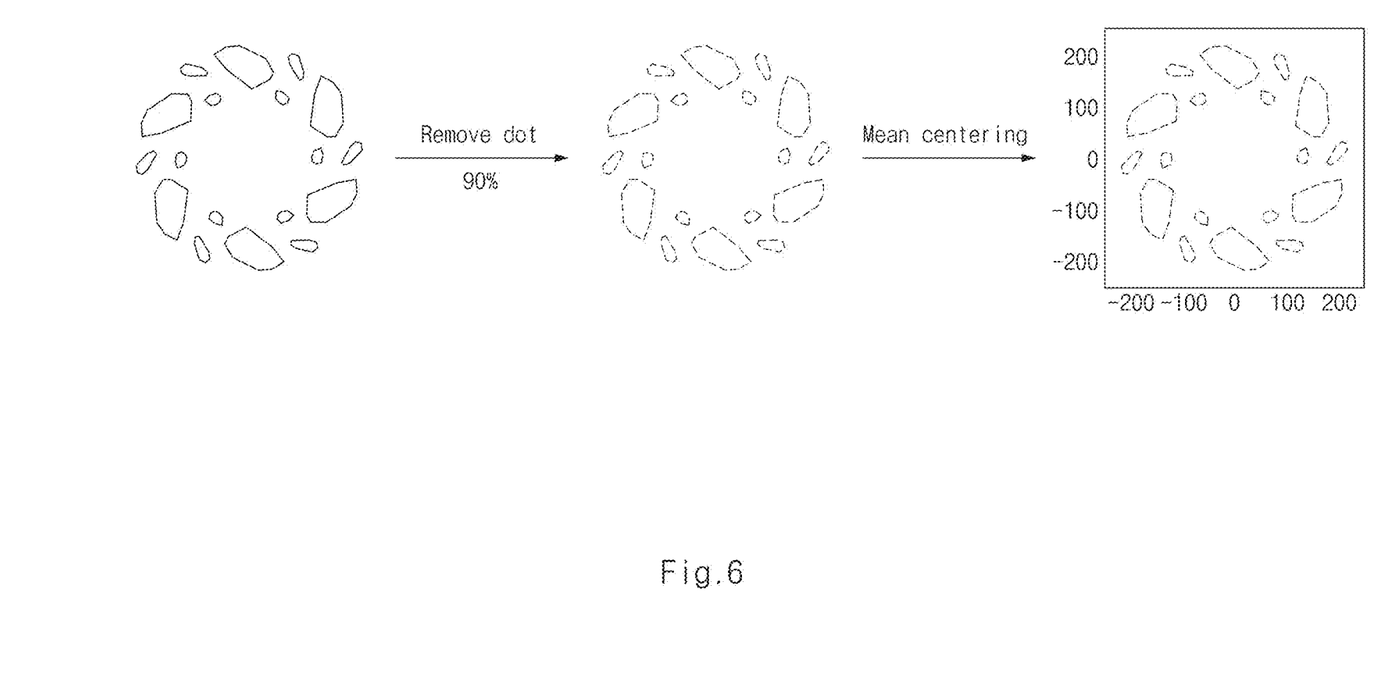
FIG. 6 is a drawing illustrating a process of representing a line composed of edges as points and determining the center of a wheel in a learning device provided in an apparatus for predicting wheel performance in a vehicle according to an embodiment of the present disclosure.
Figure 7A:
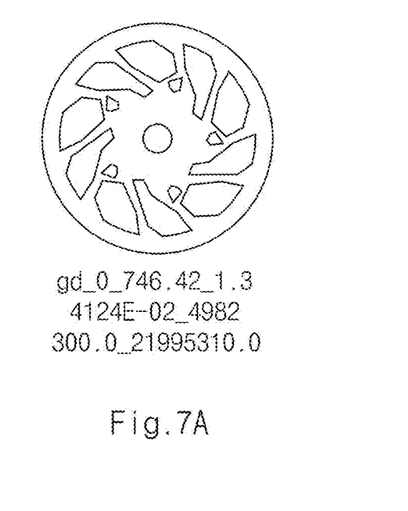
FIGS. 7A-7D are drawings illustrating a process of labeling a 2D wheel image identification number and a performance value corresponding to the 2D wheel image identification number with each data in a learning device provided in an apparatus for predicting wheel performance in a vehicle according to an embodiment of the present disclosure.
Figure 7B:
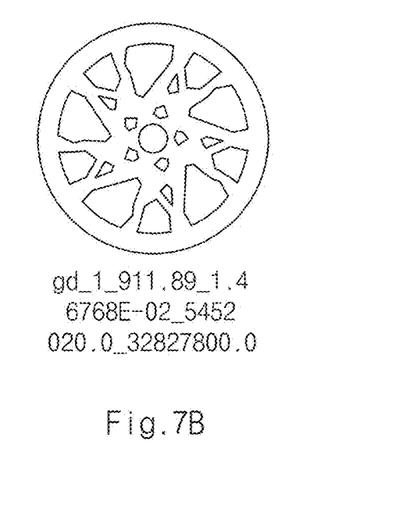
Figure 7C:
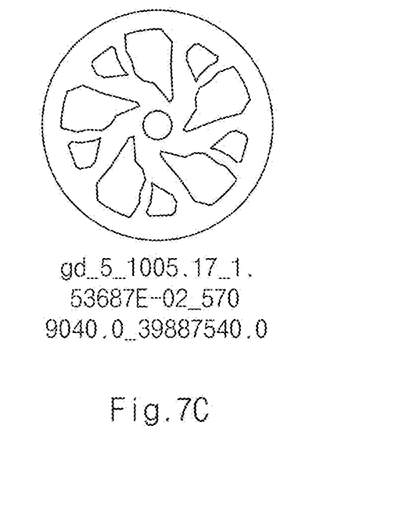
Figure 7D:
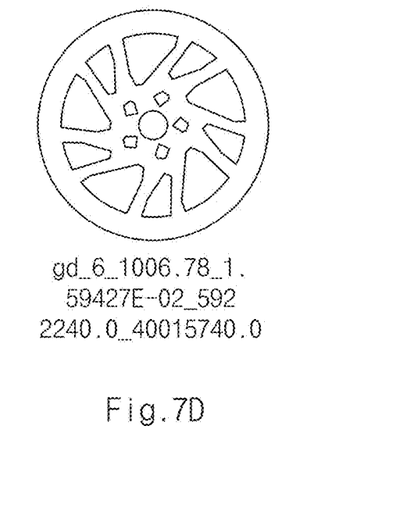
Figure 8A:
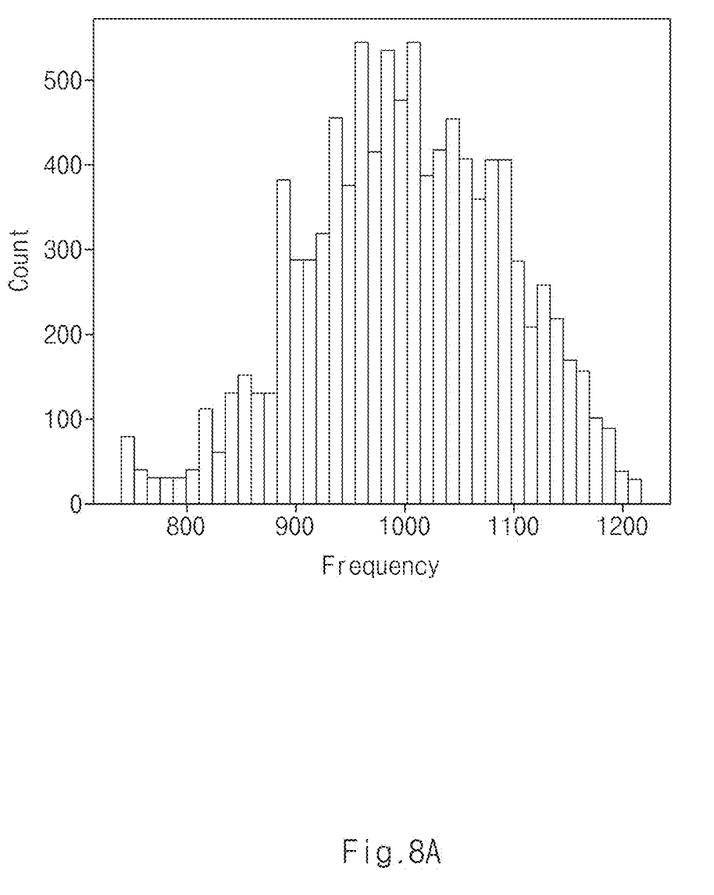
FIG. 8A is a drawing illustrating a frequency reference distribution histogram of datasets generated by a learning device provided in an apparatus for predicting wheel performance in a vehicle according to an embodiment of the present disclosure.
Figure 8B:
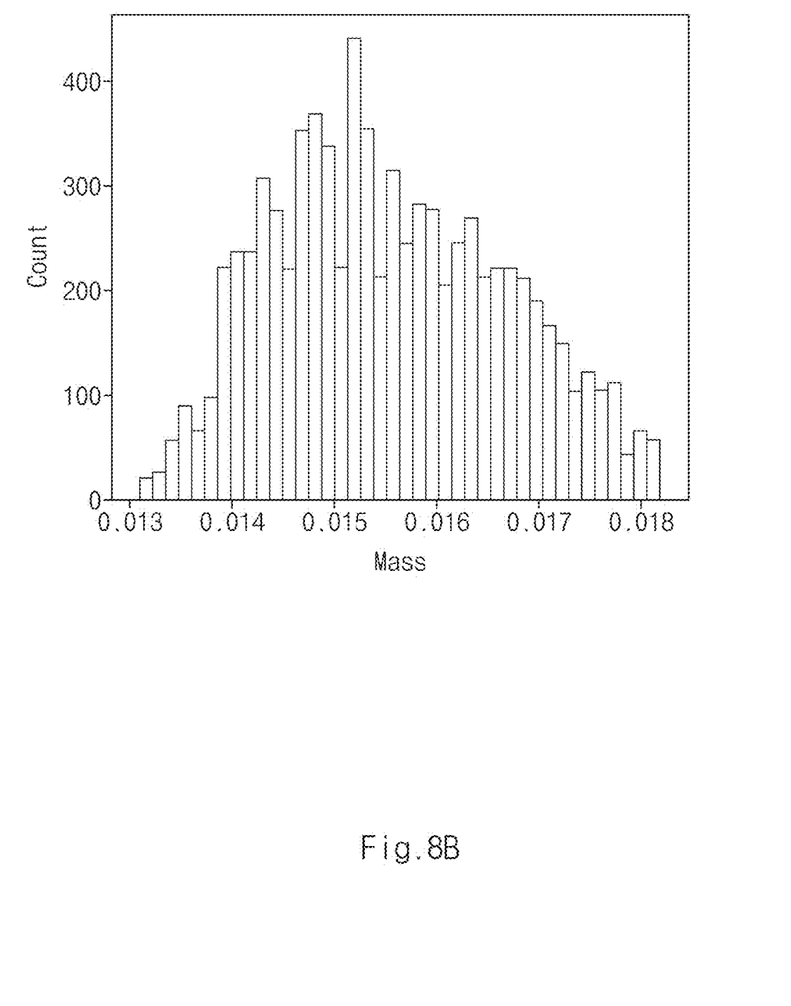
FIG. 8B is a drawing illustrating a weight reference distribution histogram of datasets generated by a learning device provided in an apparatus for predicting wheel performance in a vehicle according to an embodiment of the present disclosure.

FIG. 3 is a block diagram illustrating a learning process of a learning device provided in an apparatus for predicting wheel performance in a vehicle according to an embodiment of the present disclosure. FIG. 4 is a drawing illustrating a process of generating a plurality of 2D wheel images using generative design in a learning device provided in an apparatus for predicting wheel performance in a vehicle according to an embodiment of the present disclosure. FIG. 5 is a drawing illustrating a latent space generated using a CAE by a learning device provided in an apparatus for predicting wheel performance in a vehicle according to an embodiment of the present disclosure. FIG. 6 is a drawing illustrating a process of representing a line composed of edges as points and determining the center of a wheel in a learning device provided in an apparatus for predicting wheel performance in a vehicle according to an embodiment of the present disclosure. FIGS. 7A-7D are drawings illustrating a process of labeling a 2D wheel image identification number and a performance value corresponding to the 2D wheel image identification number with each data in a learning device provided in an apparatus for predicting wheel performance in a vehicle according to an embodiment of the present disclosure. FIG. 8A is a drawing illustrating a frequency reference distribution histogram of datasets generated by a learning device provided in an apparatus for predicting wheel performance in a vehicle according to an embodiment of the present disclosure. FIG. 8B is a drawing illustrating a weight reference distribution histogram of datasets generated by a learning device provided in an apparatus for predicting wheel performance in a vehicle according to an embodiment of the present disclosure.

Referring to FIG. 4, the learning device 30 may generate a plurality of 2D wheel images different in shape from a reference 2D wheel image, using generative design 31. For reference, generative design is an algorithm for generating an extensive design meeting requirements, which has advantages capable of reducing costs in the process of designing and manufacturing products and optimizing a design time.

Thereafter, the learning device 30 may generate a latent space for the plurality of 2D wheel images using a first CAE 32. In this case, an example of performing visualization of the latent space is shown in FIG. 5. Herein, the visualization may be performed based on T-distributed stochastic neighbor embedding (T-SNE). For reference, The T-SNE is a nonlinear dimensionality reduction technique of fetching and visualizing data on a high dimensional space to a two-dimensional (2D) or a three dimensional (3D) low dimensional space. In FIG. 5, the learning device 30 may classify codes (z) in the latent space into, for example, 20 clusters using the K-means algorithm. For reference, the K-means algorithm is an algorithm of clustering given data into k clusters, which operates in a manner which minimizes the variance of the distance difference with each cluster.

Thereafter, the learning device 30 may sample a reference number of codes (z) (e.g., 3000 codes) in the latent space using a Latin hypercube sampling from normal distribution (LHSnorm) algorithm 33, may extract wheels close to the sampled codes (z), and may remove duplicated wheels among the extracted wheels based on cluster information (group information) to finally extract a reference number of 2D wheel images (e.g., 1300 2D wheel images). In this case, because the latent space includes features of various wheels, the 2D wheel image extracted from the latent space may include the feature of the wheel.

Thereafter, the learning device 30 may convert the extracted 2D wheel images into 3D wheel images using a 2D-3D converter 34. In this case, when the learning device 30 converts the 2D wheel images into the 3D wheel images using a 3D computer aided design (CAD), a process of converting data about the 2D wheel images into a data format recognizable by the 3D CAD may be involved.

For example, when the 3D CAD is used, the process may include resizing the 2D wheel image to an 128×128 size, filtering the 2D wheel image of the 128×128 size using an anti-aliasing (AAF) filter, resizing the filtered 2D wheel image of the 128×128 size to a 2D wheel image of a 512×512 size, detecting a Sobel edge, removing a rim and an edge of an axis, storing edge coordinates on a 2D plane, adjusting the number of points with regard to an inter-point distance in a process of representing a line composed of edges as points as shown in FIG. 6, and determining the center of a wheel as shown in FIG. 6.

Thereafter, the learning device 30 may analyze the 3D wheel images using an interpretation program 35 to predict performance (an interpretation value). In this case, the performance may include natural frequency of the wheel and the mass of the wheel according to a shape of a spoke. Furthermore, it is safe that the interpretation program is any of various interpretation programs which are commonly and widely known.

Thereafter, the learning device 30 may generate a dataset (a set of data) in which performance predicted by analyzing the 3D wheel image corresponding to the 2D wheel image and the 2D wheel image are related to each other. In this case, as shown in FIGS. 7A-7D, a 2D wheel image identification number and a performance value corresponding to the 2D wheel image identification number may be labeled with each data.

Thereafter, the learning device 30 may modify the 2D wheel image in the dataset to increase the number of datasets. For example, the learning device 30 may rotate a spoke 5 times by 72 degrees on a source 2D wheel image to generate five 2D wheel images and may flip each of the five 2D wheel images to generate a total of ten 2D wheel images. As a result, the learning device 30 may generate a total of ten 2D wheel images using one 2D wheel image. In this case, performance related to each of ten 2D wheel images may be the same as performance related to the source 2D wheel image. For reference, when source datasets are 1000, the learning device 30 may generate a total of 10000 datasets. A frequency reference distribution histogram of the generated datasets is shown in, for example, FIG. 8A, and a weight reference distribution histogram of the generated datasets is shown in, for example, FIG. 8B.

Thereafter, the learning device 30 may learn the increased datasets using a second CAE. In this case, the learning device 30 may perform transfer learning based on the knowledge (the learned result) of the first CAE. Because the transfer learning itself is well known and commonly used, a detailed description thereof will be omitted. Herein, the knowledge of the first CAE may refer to a model generated by a pre-trained CAE or the first CAE.

The controller 40 may perform the overall control such that respective components may normally perform their own functions. Such a controller 40 may be implemented in the form of hardware, may be implemented in the form of software, or may be implemented in the form of a combination thereof. The controller 40 may be implemented as, but not limited to, a microprocessor or an electronic control unit (ECU).

Particularly, the controller 40 may predict performance for the 2D wheel images based on the learned result (e.g., the performance prediction model) of the learning device 30. In this case, the performance prediction model may include a CNN model which does not perform transfer learning, a TL_CAE(Log_Scaler) model which performs the transfer learning and normalizes the output value using a Log Scaler, and a TL_CAE(MinMax_Scaler) model which performs the transfer learning and normalizes the output value using a Min Max Scaler. For example, the performance analysis result of each model is shown in Table 1 below.

TABLE 1

| Model | Frequency (Hz) | | Mass (kg) | |
|---|---|---|---|---|
| | RMSE | MAPE(%) | RMSE | MAPE(%) |
| CNN | 32.0 | 4.4 | 0.15 | 3.8 |
| TL_CAE (Log_Scaler) | 92.1 | 6.1 | 0.94 | 4.8 |
| TL_CAE (MinMax_Scaler) | 18.9 | 1.4 | 0.13 | 0.7 |

In Table 1 above, it may be seen that the TL_CAE (MinMax_Scaler) model has the best root mean square error (RMSE) and mean absolute percentage error (MAPF).

The controller 40 may generate a plurality of TL_CAE (MinMax_Scaler) models and may predict an average of output values of the models as performance. In this case, the performance analyze result is shown in Table 2 below.

TABLE 2

| Method | Frequency (Hz) | | Mass (kg) | |
|---|---|---|---|---|
| | RMSE | MAPE(%) | RMSE | MAPE(%) |
| TL_CAE (MinMax_Scaler) | 18.9 | 1.4 | 0.13 | 0.7 |
| TL_CAE_Ensemble | 12.8 | 0.9 | 1.1e−04 | 0.5 |

In Table 2 above, it may be seen that the TL_CAE_Ensemble method outputs the more accurate result than when using the single TL_CAE(MinMax_Scaler) model.

Figure 9:
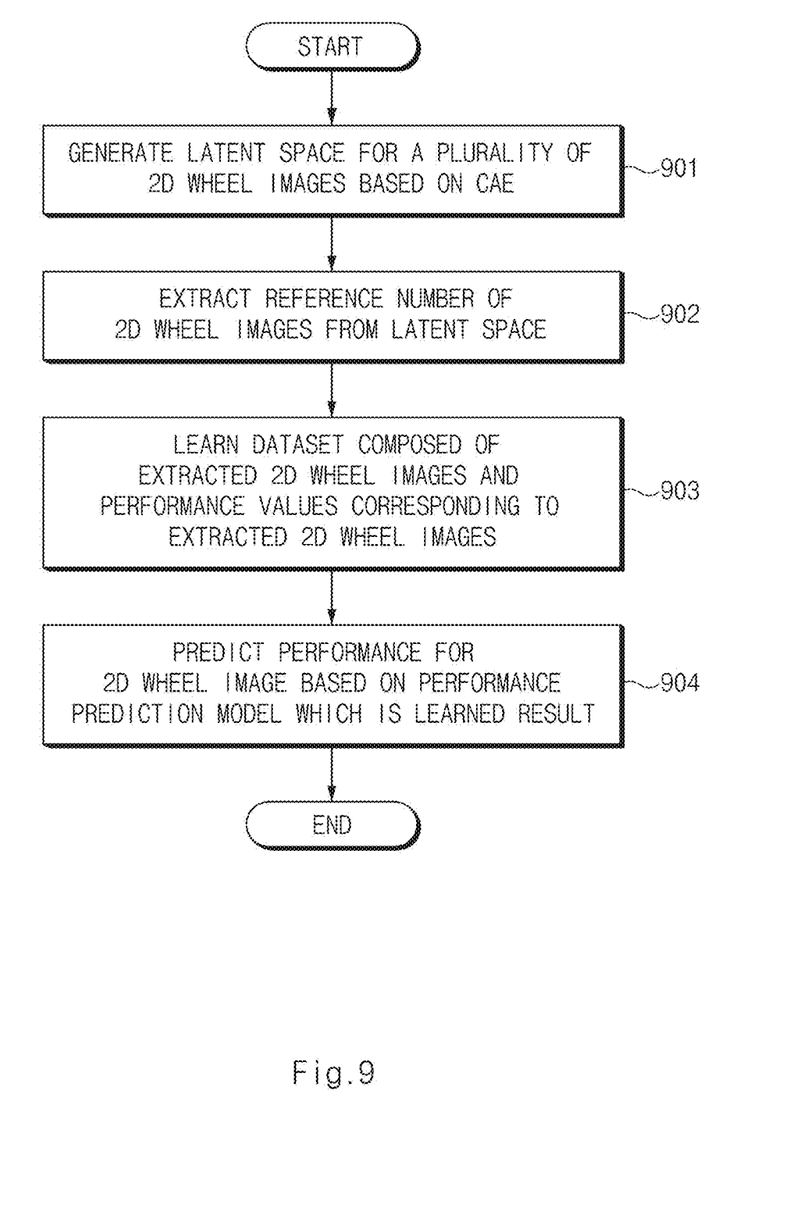
FIG. 9 is a flowchart illustrating a method for predicting wheel performance in a vehicle according to an embodiment of the present disclosure.

FIG. 9 is a flowchart illustrating a method for predicting wheel performance in a vehicle according to an embodiment of the present disclosure.

First, in operation 901, the learning device 30 of FIG. 1 may generate a latent space for a plurality of 2D wheel images based on a convolutional autoencoder (CAE).

In operation 902, the learning device 30 may extract a reference number of 2D wheel images from the latent space. Thereafter, operation 902 may include classifying codes (z) in the latent space into, for example, 20 clusters using a K-means algorithm, sampling a reference number of codes (z) (e.g., 3000 codes) in the latent space using a Latin hypercube sampling from normal distribution (LHSnorm) algorithm 33, extracting wheels close to the sampled codes (z), and removing duplicated wheels among the extracted wheels based on cluster information (group information) to finally extract a reference number of 2D wheel images (e.g., 1300 2D wheel images).

In operation 903, the learning device 30 may learn a dataset composed of the extracted 2D wheel images and performance values corresponding to the extracted 2D wheel images.

In operation 904, a controller 40 of FIG. 1 may predict performance for the 2D wheel images based on a performance prediction model which is the learned result of the learning device 30.

Figure 10:
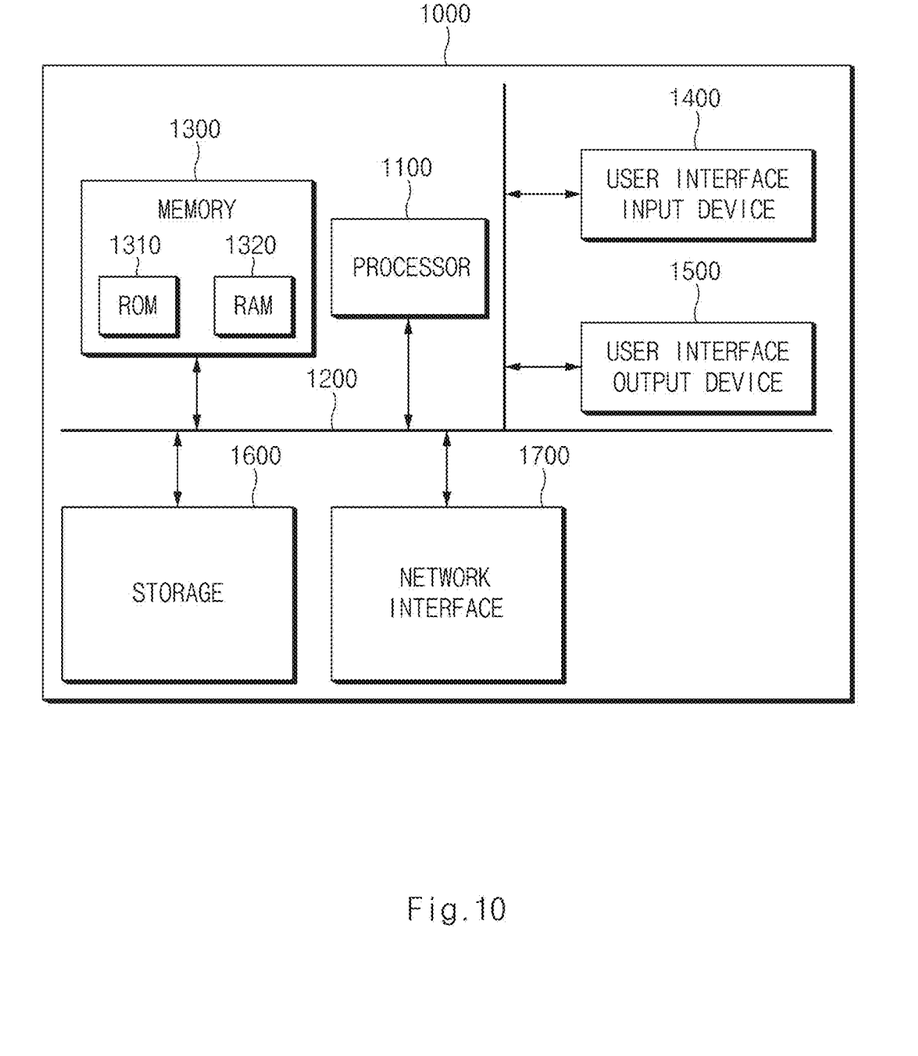
FIG. 10 is a block diagram illustrating a computing system for executing a method for predicting wheel performance in a vehicle according to an embodiment of the present disclosure.

FIG. 10 is a block diagram illustrating a computing system for executing a method for predicting wheel performance in a vehicle according to an embodiment of the present disclosure.

Referring to FIG. 10, the above-mentioned method for predicting the wheel performance in the vehicle according to an embodiment of the present disclosure may be implemented by means of the computing system. A computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor, or in a combination thereof. The software module may reside on a storage medium (that is, the memory 1300 and/or the storage 1600) such as a RAM, a flash memory, a ROM, an EPROM, an EEPROM, a register, a hard disk, a SSD (Solid State Drive), a removable disk, and a CD-ROM. The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

The apparatus for predicting the wheel performance in the vehicle and the method therefor are provided to generate a latent space for a plurality of 2D wheel images based on a CAE, extract a reference number of 2D wheel images from the latent space, learn a dataset composed of the extracted 2D wheel images and performance values corresponding to the extracted 2D wheel images, and predict performance for a new 2D wheel image based on the learned result, thus predicting the performance for the 2D wheel images without the process of converting the 2D wheel images into 3D wheel images.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for predicting performance of a wheel in a vehicle, the apparatus comprising:
   a learning device configured to:
     generate a latent space for a plurality of two-dimensional (2D) wheel images based on a convolutional autoencoder (CAE),
     extract a predetermined number of 2D wheel images from the latent space, and
     learn a dataset having the extracted 2D wheel images and performance values corresponding to the extracted 2D wheel images; and
   a controller configured to predict performance for a 2D wheel image based on a performance prediction model as learned result of obtained by the learning device,
   wherein the learning device generates the plurality of 2D wheel images each of which having a shape different from that of a reference 2D wheel image using generative design.

2. The apparatus of claim 1, wherein the learning device performs transfer learning based on a learning model generated from the CAE.

3. The apparatus of claim 1, wherein the learning device samples codes in the latent space using Latin hypercube sampling from normal distribution (LHSnorm) algorithm and extracts the predetermined number of 2D wheel images based on the sampled codes.

4. The apparatus of claim 1, wherein the learning device converts the extracted 2D wheel images into three-dimensional (3D) wheel images and analyzes the 3D wheel images to predict the performance values.

5. The apparatus of claim 4, wherein the learning device generates dataset in which the predicted performance values and the extracted 2D wheel images are related to each other.

6. The apparatus of claim 1, wherein the learning device modifies the extracted 2D wheel images in the dataset to increase a number of datasets.

7. The apparatus of claim 6, wherein the learning device rotates a spoke five times by 72 degrees on a source 2D wheel image to generate five 2D wheel images and flips the five 2D wheel images to generate ten 2D wheel images.

8. The apparatus of claim 1, wherein the performance includes at least one of natural frequency of the wheel or a mass of the wheel according to a shape of a spoke.

9. A method for predicting performance of a wheel in a vehicle, the method comprising:
   generating, by a learning device, a latent space for a plurality of 2D wheel images based on a convolutional autoencoder (CAE);
   extracting, by the learning device, a predetermined number of 2D wheel images from the latent space;
   learning, by the learning device, a dataset having the extracted 2D wheel images and performance values corresponding to the extracted 2D wheel images; and
   predicting, by a controller, performance for a 2D wheel image based on a performance prediction model as learned result of obtained by the learning device,
   wherein the generating of the latent space for the plurality of 2D wheel images includes generating the plurality of 2D wheel images each of which having a shape different from that of a reference 2D wheel image using generative design.

10. The method of claim 9, wherein the learning of the dataset includes performing transfer learning based on a learning model generated from the CAE.

11. The method of claim 9, wherein the extracting of the predetermined number of the plurality of 2D wheel images includes:
   sampling codes in the latent space using Latin hypercube sampling from normal distribution (LHSnorm) algorithm; and
   extracting the predetermined number of 2D wheel images based on the sampled codes.

12. The method of claim 9, wherein the learning of the dataset includes:
   converting the extracted 2D wheel images into three-dimensional (3D) wheel images; and
   analyzing the 3D wheel images to predict the performance values.

13. The method of claim 12, wherein the learning of the dataset further includes:
   generating dataset in which the predicted performance values and the extracted 2D wheel images are related to each other.

14. The method of claim 9, wherein the learning of the dataset includes modifying the extracted 2D wheel images in the dataset to increase a number of datasets.

15. The method of claim 14, wherein the increasing of the number of the datasets includes:
   rotating a spoke five times by 72 degrees on a source 2D wheel image to generate five 2D wheel images; and
   flipping the five 2D wheel images to generate ten 2D wheel images.

16. The method of claim 9, wherein the performance includes at least one of natural frequency of the wheel or a mass of the wheel according to a shape of a spoke.

* * * * *